(12) United States Patent
Hua et al.

(10) Patent No.: US 10,701,527 B2
(45) Date of Patent: Jun. 30, 2020

(54) MULTICAST TRANSMISSION METHOD, BASE STATION, AND USER EQUIPMENT

(71) Applicant: HUAWEI TECHNOLOGIES CO., LTD., Shenzhen, Guangdong (CN)

(72) Inventors: Yao Hua, Shenzhen (CN); Bingzhao Li, Beijing (CN); Xiao Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/138,475

(22) Filed: Sep. 21, 2018

(65) Prior Publication Data

US 2019/0028854 A1   Jan. 24, 2019

Related U.S. Application Data

(63) Continuation of application No. PCT/CN2016/078211, filed on Mar. 31, 2016.

(51) Int. Cl.
*H04L 12/28* (2006.01)
*H04W 4/06* (2009.01)
(Continued)

(52) U.S. Cl.
CPC .............. *H04W 4/06* (2013.01); *H04W 8/24* (2013.01); *H04W 36/08* (2013.01);
(Continued)

(58) Field of Classification Search
CPC ........................................................ H04L 12/28
(Continued)

(56) References Cited

U.S. PATENT DOCUMENTS

| 9,960,895 B2 * | 5/2018 | Dinan .................. H04L 5/0053 |
| 2012/0236776 A1 | 9/2012 | Zhang et al. |
| 2014/0185455 A1 | 7/2014 | Balasubramanian et al. |

FOREIGN PATENT DOCUMENTS

| CN | 101772222 A | 7/2010 |
| CN | 102857867 A | 1/2013 |

(Continued)

OTHER PUBLICATIONS

Extended European Search Report issued in European Application No. 16896024.3 dated Apr. 26, 2019, 15 pages.

(Continued)

Primary Examiner — Dang T Ton
(74) Attorney, Agent, or Firm — Fish & Richardson P.C.

(57) ABSTRACT

A multicast transmission method is disclosed. A base station of a first cell obtains first multicast resource information of at least one second cell, where the base station of the first cell is different from a base station of each second cell; and the base station of the first cell sends second multicast resource information to user equipment, where the second multicast resource information is used to indicate a resource configuration used by each second cell to transmit multicast service data. The base station of the first cell actively sends obtained multicast resource information to the user equipment in a broadcast manner. In this way, the base station of the first cell does not need to configure, in a unicast manner for each user equipment, a resource location for sending/reading the multicast service data of each second cell, thereby reducing signaling overheads.

14 Claims, 6 Drawing Sheets

(51) Int. Cl.
    *H04W 88/18*     (2009.01)
    *H04W 72/00*     (2009.01)
    *H04W 8/24*     (2009.01)
    *H04W 36/08*     (2009.01)
    *H04W 36/00*     (2009.01)
    *H04W 84/04*     (2009.01)

(52) U.S. Cl.
    CPC ......... *H04W 72/005* (2013.01); *H04W 88/18* (2013.01); *H04W 36/0061* (2013.01); *H04W 84/042* (2013.01)

(58) Field of Classification Search
    USPC ........................................................ 370/329
    See application file for complete search history.

(56) References Cited

FOREIGN PATENT DOCUMENTS

| | | |
|---|---|---|
| CN | 105101429 A | 11/2015 |
| EP | 2733981 A2 | 5/2014 |
| EP | 2887739 A1 | 6/2015 |
| WO | 2004017579 A1 | 2/2004 |
| WO | 2015085457 A1 | 6/2015 |

OTHER PUBLICATIONS

International Search Report and Written Opinion issued in International Application No. PCT/CN2016/078211 dated Dec. 26, 2016, 21 pages.
Communication pursuant to Rule 164(1) EPC issued in European Application No. 16896024.3 dated Nov. 26, 2018, 14 pages.

\* cited by examiner

MULTICAST TRANSMISSION METHOD, BASE STATION, AND USER EQUIPMENT

CROSS-REFERENCE TO RELATED APPLICATIONS

This application is a continuation of International Application No. PCT/CN2016/078211, filed on Mar. 31, 2016, the disclosure of which is hereby incorporated by reference in its entirety.

TECHNICAL FIELD

The present invention relates to the field of communications technologies, and in particular, to a multicast transmission method, a base station, and user equipment.

BACKGROUND

With rapid development of the Internet and popularization of large-screen multi-functional user equipment (UE), a large quantity of mobile data multimedia services and various high-bandwidth multimedia services such as a video conference, television broadcasting, a video on demand, an advertisement, online education, an interactive game, and the Internet of Vehicles have emerged. These services not only meet a multiservice requirement of a mobile user, but also provide a new service growth point to an operator. These mobile data multimedia services require a plurality of users to receive same data at the same time, and have features such as a large data volume and long duration compared with a common data service.

To effectively use a mobile network resource, a Multimedia Broadcast Multicast Service (MBMS) is provided in the 3rd Generation Partnership Project (3GPP). The service is a technology for delivering data from one data source to a plurality of target UEs, implements sharing of a network (including a core network and an access network) resource, and improves utilization of the network resource (particularly an air interface resource).

However, with development of a network, in addition to obtaining a multicast service of the cell, a user of a cell may further need to obtain a multicast service of another cell. Before obtaining multicast service data of the another cell, the user of the cell further needs to determine a resource configuration of the multicast service of the another cell. In the prior art, a similar cross-cell resource configuration obtaining manner has been used in a device-to-device (D2D) technology. However, the prior art has the following disadvantage: Each user needs to apply to the cell for obtaining the resource configuration of the another cell, and the cell configures, in a unicast manner for each user that needs to read the multicast service of the another cell, sending/reading of a resource location of the another cell for transmitting the multicast service, causing a large quantity of signaling overheads.

SUMMARY

An objective of this application is to provide an improved multicast transmission method, so as to reduce signaling overheads.

A first aspect provides a multicast transmission method, and the technical solution is described from a perspective of a base station of a first cell. Specifically, the base station of the first cell obtains first multicast resource information of at least one second cell, where the base station of the first cell is different from a base station of each second cell; and the base station of the first cell sends second multicast resource information to user equipment, where the second multicast resource information is used to indicate a resource configuration used by each second cell to transmit multicast service data.

In the technical solution, the base station of the first cell obtains multicast resource information of the at least one second cell, and actively sends the obtained multicast resource information to the user equipment in a broadcast manner. In this way, the base station of the first cell does not need to configure, in a unicast manner for each user equipment, receiving of a resource location of the multicast service data of the second cell, thereby reducing signaling overheads.

In a possible design, the first multicast resource information may be sent to user equipment served by the base station of the first cell, by using an extended broadcast message in an existing system, for example, a system information block (SIB) message or a broadcast control channel (MCCH) message in a Long Term Evolution (LTE) system, or may be notified to the user equipment by using a paging (paging) message, or the multicast resource information may be separately sent, by using dedicated signaling (such as RRC signaling in an LTE system), to each user, in the cell, who reports that the user is interested in a multicast service of the at least one second cell.

In a possible design, a gap location indicated by the second multicast resource information corresponds to the resource location used by the second cell to transmit the multicast service data.

In a possible design, the first multicast resource information includes time domain offset information, and the time domain offset information is used to indicate a time offset between the first cell and each second cell. In LTE, the time offset may be understood as a difference between system subframes of two cells.

In the technical solution, the time offset exists between cells in which a user is located during a handover from the first cell to the second cell. After being handed over from the first cell to another cell, the user equipment may perform receiving at the resource location corresponding to the second cell, based on the time offset information of the two cells that is included in resource configuration information received by the first cell, for example, the subframe difference between the two cells in LTE, and does not need to resynchronize with the base station of the second cell.

In a possible design, the time domain offset between the first cell in which the user is located before the handover and the second cell in which the user is located after the handover has already been considered in the first multicast resource information. In other words, the provided first multicast resource information already corresponds to a time domain location of the second cell.

In a possible design, the second multicast resource information further includes service type information of the multicast service data.

In the technical solution, the user equipment may determine, based on the service type information of the multicast service data, whether to receive the multicast service data by using the resource configuration in the multicast resource information of the second cell.

In a possible design, the first cell may obtain the first multicast resource information of the at least one second cell by using a signaling interaction interface or an operation, administration and maintenance interface.

In a possible design, the first cell receives a resource request feedback message sent by the user equipment, where the resource request feedback message carries the first multicast resource information of the at least one second cell.

In a possible design, the first cell sends a resource request message to user equipment in a connected state, where the resource request message is used to instruct the user equipment to read the first multicast resource information of the at least one second cell and report the first multicast resource information of the at least one second cell to the base station of the first cell.

In a possible design, the user equipment in the connected state has a capability of reading the resource configuration of the at least one second cell, and the first cell has already obtained, in advance, capability reporting information indicating that the user equipment has the capability.

In the technical solution, the base station of the first cell and the base station of each second cell are completely independent of each other, and no interface used for mutual communication is set. In this case, the base station of the first cell may send the resource request message to the user equipment that has the capability of reading the resource configuration of the second cell, to request the resource configuration of the second cell, avoiding the user equipment that has the capability of reading the resource configuration of the second cell from obtaining the multicast resource information of the second cell after receiving the resource request message.

In a possible design, the resource request message includes at least one of the following parameters:

a list parameter used to request a PLMN identifier of the at least one second cell;

a list parameter used to request a cell identifier of the at least one second cell;

a list parameter used to request a carrier frequency of the at least one second cell;

a list parameter used to request a multicast group identifier of the at least one second cell, where the multicast group identifier is a terminal mobile group identity (TMGI) in LTE;

a parameter used to indicate whether to report the resource configuration;

a parameter used to indicate whether to report the time domain offset information;

a parameter used to indicate a time location that is used by the user equipment to read the first multicast resource information; and a parameter used to indicate a timer that is used when the user equipment reads the first multicast resource information, similar to T321 in LTE. The base station of the first cell may configure a timer for this operation. After receiving the resource request message, the user equipment starts the timer based on a configuration of the timer, and feeds back a measurement result within a time specified by the timer. If no measurement result is obtained when the timer expires, a measurement failure is fed back to the base station of the first cell.

The user equipment obtains the first multicast resource information based on the parameter in the resource request message.

In a possible design, the base station of the first cell receives a configuration request message sent by the user equipment. The base station of the first cell obtains the first multicast resource information of the at least one second cell only after receiving the configuration request message.

In the technical solution, the user equipment may actively request, from the base station of the first cell, the multicast resource information of the multicast service in which the user equipment is interested, including a multicast resource of interest of the at least one second cell. The base station of the first cell learns, based on information that is about the multicast service of interest and that is reported by the user, whether the cell currently obtains the multicast resource information of the multicast service in which the user is interested. If the cell does not currently obtain any multicast resource information of the multicast service in which the user is interested, the base station of the first cell may send the resource request message to the user equipment that has the capability of reading the resource configuration of the at least one second cell.

In a possible design, after sending the multicast resource information, the base station of the first cell receives a feedback message sent by the user equipment, where the feedback message is sent by the user equipment when a configured resource location of at least one cell of the at least one second cell is inconsistent with a resource location used by the cell to transmit the multicast service data. The base station of the first cell sends multicast resource request information to one or more second cells whose resource locations are inconsistent with resource locations configured by the base station of the first cell, where the multicast resource request information is used to request a resource configuration of the one or more second cells.

The feedback information may carry one or more of the following information: 1-bit information indication, a PLMN identifier list of the at least one second cell, a carrier frequency list of the at least one second cell, and a multicast group identifier list of the at least one second cell.

In a possible design, the base station of the first cell receives handover request information sent by the second cell, where the handover request information carries at least one of the following information: multicast resource information that is of at least one third cell and that is configured by the second cell for user equipment to be handed over, and a time domain offset between a cell before the handover and a cell after the handover, where the time domain offset is used to instruct the user equipment to adjust the resource location for receiving the multicast service data to a time domain location of the cell after the handover.

In the technical solution, in a handover process of the user equipment, the base station of the first cell sends, to the cell after the handover, the multicast resource information configured for the user equipment. After the handover, the user equipment is avoided from obtaining the multicast resource information from the cell after the handover and considering the time domain offset between the cell before the handover and the cell after the handover, so as to shorten an interruption time for receiving the multicast service data of the at least one second cell.

A second aspect provides a multicast transmission method, and the transmission method corresponds to a transmission method in the first aspect. Specifically, user equipment receives multicast resource information sent by a base station of a first cell, where the multicast resource information is used to indicate a resource configuration used by at least one second cell to transmit multicast service data.

In a possible design, the multicast resource information further includes service type information of the multicast service data. The user equipment determines, based on the service type information, whether to receive the multicast service data by using the resource configuration in the multicast resource information.

In a possible design, the user equipment may determine, based on the service type information, whether a priority of the multicast service data is higher than a priority of unicast service data transmitted by the base station of the first cell to the user equipment. If the priority of the multicast service data is higher than the priority of the unicast service data transmitted by the base station of the first cell to the user equipment, the user equipment receives the multicast service data based on the resource configuration, and when receiving the multicast service data, the user equipment skips responding to scheduling signaling of the unicast service data from the base station of the first cell.

In a possible design, the multicast resource information further includes time domain offset information, and the time domain offset information is used to indicate a time offset between the first cell and each second cell.

In a possible design, the time domain offset between the first cell and the at least one second cell has already been considered in the multicast resource information. In other words, the provided multicast resource information already corresponds to a time domain location of the first cell.

In a possible design, after being handed over to the second cell, the user equipment receives configuration signaling sent from a base station of the second cell, where the configuration signaling carries at least one of the following information configured by the second cell for the user equipment: multicast resource information of at least one third cell, and a time domain offset between a cell before the handover and a cell after the handover. The user equipment calculates, based on the configuration signaling, a time domain location used by the at least one third cell to transmit multicast service data, and receives the multicast service data at the time domain location.

In a possible design, in a process in which the user equipment is handed over from the first cell to the second cell, the first cell sends first request information (such as handover request information in an LTE system) to the second cell, where the first request information includes indication information of the user equipment, so that the second cell determines a first bearer of the user equipment, and the first bearer (for example, an E-RAB bearer) supports both a device-to-device direct link and a device-to-base station transmission link. For example, the indication information is used to indicate a first service type that is being transmitted by the user equipment. For example, the service type may be a V2X service, and the indication information may be any information that can be used to indicate a feature of the bearer that can be supported by the user equipment.

In another possible design, the first cell sends first configuration information to the second cell, the first configuration information is used to indicate a transmission manner used by the first cell for a first service, and the transmission manner may be device-to-device direct link transmission and device-to-base station transmission.

In a possible design, the user equipment sends a configuration request message to the first cell, where the configuration request message is used to request the resource configuration used to receive the multicast service data.

In a possible design, when determining that a resource location that is of at least one cell of the at least one second cell and that is configured by the base station of the first cell is inconsistent with a resource location used by the cell to transmit the multicast service data, the user equipment sends a feedback message to the base station of the first cell.

A third aspect provides another multicast transmission method, and the transmission method corresponds to a transmission method in the first aspect and is described from a side of user equipment. Specifically, the user equipment receives a resource request message sent by a base station of a first cell; the user equipment reads first multicast resource information of at least one second cell at a specified location of the at least one second cell based on the resource request message; and the user equipment adds the first multicast resource information to a resource request feedback message, and reports the resource request feedback message to the base station of the first cell.

In a possible design, before receiving the resource request message sent by the base station of the first cell, the user equipment further sends capability reporting information to the base station of the first cell, where the capability reporting information is used to indicate that the user equipment has a capability of reading a resource configuration of each second cell.

In a possible design, the resource request feedback message includes at least one of the following parameters:
a PLMN identifier list of the at least one second cell;
a cell identifier list of the at least one second cell;
a carrier frequency list of the at least one second cell;
a multicast group identifier list of the at least one second cell; and
a time domain resource used by the at least one second cell to transmit the multicast service data.

A fourth aspect provides a base station, and the base station has a function of implementing base station behavior in the first cell in the method of the first aspect. The function may be implemented by hardware, or may be implemented by hardware by executing corresponding software. The hardware or the software includes one or more modules corresponding to the function. Specifically, the base station may include a receiving module and a sending module.

The receiving module is configured to obtain first multicast resource information of at least one second cell, where the base station of the first cell is different from a base station of each second cell. The sending module is configured to send second multicast resource information to user equipment, where the second multicast resource information is used to indicate a resource configuration used by each second cell to transmit multicast service data.

In a possible design, the first multicast resource information includes time domain offset information, and the time domain offset information is used to indicate a time offset between the first cell and each second cell.

In a possible design, the first multicast resource information further includes service type information of the multicast service data.

In a possible design, the receiving module is configured to obtain the first multicast resource information of the at least one second cell by using a signaling interaction interface or an operation, administration and maintenance interface.

In a possible design, the receiving module is further configured to receive a resource request feedback message sent by the user equipment, where the resource request feedback message carries the first multicast resource information of the at least one second cell.

In a possible design, the sending module is further configured to send a resource request message to user equipment in a connected state, where the resource request message is used to instruct the user equipment to read the first multicast resource information of the at least one second cell and report the first multicast resource information of the at least one second cell to the base station of the first cell.

In a possible design, the user equipment in the connected state has a capability of reading the resource configuration of the at least one second cell, and the first cell has already obtained, in advance, capability reporting information indicating that the user equipment has the capability.

In a possible design, the resource request message includes at least one of the following parameters:

a list parameter used to request a PLMN identifier of the at least one second cell;

a list parameter used to request a cell identifier of the at least one second cell;

a list parameter used to request a carrier frequency of the at least one second cell;

a list parameter used to request a multicast group identifier of the at least one second cell;

a parameter used to indicate whether to report the resource configuration;

a parameter used to indicate whether to report the time domain offset information;

a parameter used to indicate a time location that is used by the user equipment to read the first multicast resource information; and a parameter used to indicate a timer that is used when the user equipment reads the first multicast resource information.

In a possible design, the receiving module is further configured to receive a configuration request message sent by the user equipment, where the configuration request message is used to request the first multicast resource information of the at least one second cell.

In a possible design, the receiving module is further configured to receive a feedback message sent by the user equipment, where the feedback message is sent by the user equipment when a configured resource location of at least one cell of the at least one second cell is inconsistent with a resource location used by the cell to transmit the multicast service data.

The sending module is further configured to send multicast resource request information to one or more second cells whose resource locations are inconsistent with resource locations configured by the base station of the first cell, where the multicast resource request information is used to request a resource configuration of the one or more second cells.

In a possible design, the receiving module is further configured to receive handover request information sent by the second cell, where the handover request information carries at least one of the following information: multicast resource information that is of at least one third cell and that is configured by the second cell for user equipment to be handed over, and a time domain offset between a cell before the handover and a cell after the handover, where the time domain offset is used to instruct the user equipment to adjust the resource location for receiving the multicast service data to a time domain location of the cell after the handover.

A fifth aspect provides a base station, and the base station includes a processor, a memory, and a network interface. The network interface may include a radio frequency receiver and a radio frequency transmitter. The processor is connected to the memory and the network interface. The processor may perform the following operations:

obtaining first multicast resource information of at least one second cell by using the radio frequency receiver, where a base station of the first cell and is different from a base station of each second cell; and sending second multicast resource information to user equipment by using the radio frequency transmitter, where the second multicast resource information is used to indicate a resource configuration used by each second cell to transmit multicast service data.

In a possible design, the first multicast resource information includes time domain offset information, and the time domain offset information is used to indicate a time offset between the first cell and each second cell.

In a possible design, the first multicast resource information further includes service type information of the multicast service data.

In a possible design, the processor may obtain the first multicast resource information of the at least one second cell by using a signaling interaction interface or an operation, administration and maintenance interface.

In a possible design, the processor may receive, by using the radio frequency receiver, a resource request feedback message sent by the user equipment, where the resource request feedback message carries the first multicast resource information of the at least one second cell.

In a possible design, the processor may send a resource request message to user equipment in a connected state by using the radio frequency transmitter, where the resource request message is used to instruct the user equipment to read the first multicast resource information of the at least one second cell and report the first multicast resource information of the at least one second cell to the base station of the first cell.

In a possible design, the user equipment in the connected state has a capability of reading the resource configuration of the at least one second cell, and the first cell has already obtained, in advance, capability reporting information indicating that the user equipment has the capability.

In a possible design, the resource request message includes at least one of the following parameters:

a list parameter used to request a PLMN identifier of the at least one second cell;

a list parameter used to request a cell identifier of the at least one second cell;

a list parameter used to request a carrier frequency of the at least one second cell;

a list parameter used to request a multicast group identifier of the at least one second cell;

a parameter used to indicate whether to report the resource configuration;

a parameter used to indicate whether to report the time domain offset information;

a parameter used to indicate a time location that is used by the user equipment to read the first multicast resource information; and a parameter used to indicate a timer that is used when the user equipment reads the first multicast resource information.

In a possible design, the processor may receive, by using the radio frequency receiver, a configuration request message sent by the user equipment, where the configuration request message is used to request the first multicast resource information of the at least one second cell.

In a possible design, the processor may receive, by using the radio frequency receiver, a feedback message sent by the user equipment, where the feedback message is sent by the user equipment when a configured resource location of at least one cell of the at least one second cell is inconsistent with a resource location used by the cell to transmit the multicast service data. The processor may further send, by using the radio frequency transmitter, multicast resource request information to one or more second cells whose resource locations are inconsistent with resource locations configured by the base station of the first cell, where the multicast resource request information is used to request a resource configuration of the one or more second cells.

In a possible design, the processor may receive, by using the radio frequency receiver, handover request information sent by the second cell, where the handover request information carries at least one of the following information: multicast resource information that is of at least one third cell and that is configured by the second cell for user equipment to be handed over, and a time domain offset between a cell before the handover and a cell after the handover, where the time domain offset is used to instruct the user equipment to adjust the resource location for receiving the multicast service data to a time domain location of the cell after the handover.

A sixth aspect provides user equipment, and the user equipment has a function of implementing user equipment behavior in the method design of the second aspect. The function may be implemented by hardware, or may be implemented by hardware by executing corresponding software. The hardware or the software includes one or more modules corresponding to the function. The module may be software and/or hardware. Specifically, the user equipment includes a receiving module, a sending module, and a processing module.

The receiving module is configured to receive multicast resource information sent by a base station of a first cell, where the multicast resource information is used to indicate a resource configuration used by at least one second cell to transmit multicast service data.

In a possible design, the multicast resource information further includes service type information of the multicast service data. The processing module is configured to determine, based on the service type information, whether to receive the multicast service data by using the resource configuration in the multicast resource information.

In a possible design, the processing module is configured to: determine, based on the service type information, whether a priority of the multicast service data is higher than a priority of unicast service data transmitted by the base station of the first cell to the user equipment; and if the priority of the multicast service data is higher than the priority of the unicast service data transmitted by the base station of the first cell to the user equipment, receive the multicast service data based on the resource configuration, and when receiving the multicast service data, skip responding to scheduling signaling of the unicast service data from the base station of the first cell.

In a possible design, the multicast resource information further includes time domain offset information, and the time domain offset information is used to indicate a time offset between the first cell and each second cell.

In a possible design, the receiving module is further configured to: after the user equipment is handed over to the second cell, receive configuration signaling sent from a base station of the second cell, where the configuration signaling carries at least one of the following information configured by the second cell for the user equipment: multicast resource information of at least one third cell, and a time domain offset between a cell before the handover and a cell after the handover. The processing module is further configured to: calculate, based on the configuration signaling, a time domain location used by the at least one third cell to transmit multicast service data, and receive the multicast service data at the time domain location.

In a possible design, the sending module is configured to send a configuration request message to the base station of the first cell, where the configuration request message is used to request the resource configuration used to receive the multicast service data.

In a possible design, the sending module is configured to: when a resource location that is of at least one cell of the at least one second cell and that is configured by the base station of the first cell is inconsistent with a resource location used by the cell to transmit the multicast service data, send a feedback message to the base station of the first cell.

A seventh aspect provides user equipment, and the user equipment includes a processor, a memory, and a network interface. The network interface may include a radio frequency receiver and a radio frequency transmitter. The processor is connected to the memory and the network interface. The processor may perform the following operation:

receiving, by using the radio frequency receiver, multicast resource information sent by a base station of a first cell, where the multicast resource information is used to indicate a resource configuration used by at least one second cell to transmit multicast service data.

In a possible design, the multicast resource information further includes service type information of the multicast service data. The processor may determine, based on the service type information, whether to receive the multicast service data by using the resource configuration in the multicast resource information.

In a possible design, the processor may determine, based on the service type information, whether a priority of the multicast service data is higher than a priority of unicast service data transmitted by the base station of the first cell to the user equipment; and if the priority of the multicast service data is higher than the priority of the unicast service data transmitted by the base station of the first cell to the user equipment, receive the multicast service data based on the resource configuration, and when receiving the multicast service data, skip responding to scheduling signaling of the unicast service data from the base station of the first cell.

In a possible design, the multicast resource information further includes time domain offset information, and the time domain offset information is used to indicate a time offset between the first cell and each second cell.

In a possible design, after the user equipment is handed over to the second cell, the processor may receive, by using the radio frequency receiver, configuration signaling sent from a base station of the second cell, where the configuration signaling carries at least one of the following information configured by the second cell for the user equipment: multicast resource information of at least one third cell, and a time domain offset between a cell before the handover and a cell after the handover. The processor calculates, based on the configuration signaling, a time domain location used by the at least one third cell to transmit multicast service data, and receives the multicast service data at the time domain location.

In a possible design, the processor sends a configuration request message to the base station of the first cell by using the radio frequency transmitter, where the configuration request message is used to request the resource configuration used to receive the multicast service data.

In a possible design, when determining that a resource location that is of at least one cell of the at least one second cell and that is configured by the base station of the first cell is inconsistent with a resource location used by the cell to transmit the multicast service data, the processor sends a feedback message to the base station of the first cell by using the radio frequency transmitter.

An eighth aspect provides user equipment, and the user equipment has a function of implementing user equipment behavior in the method design of the third aspect. The function may be implemented by hardware, or may be implemented by hardware by executing corresponding software. The hardware or the software includes one or more modules corresponding to the function. The module may be software and/or hardware. Specifically, the user equipment includes a receiving module, a sending module, and a processing module.

The receiving module is configured to receive a resource request message sent by a base station of a first cell. The processing module is configured to read first multicast resource information of at least one second cell at a specified location of the at least one second cell based on the resource request message. The processing module is further configured to add the first multicast resource information to a resource request feedback message. The sending module is configured to report the resource request feedback message to the base station of the first cell.

In a possible design, the sending module is further configured to send capability reporting information to the base station of the first cell, where the capability reporting information is used to indicate that the user equipment has a capability of reading a resource configuration of each second cell.

In a possible design, the resource request feedback message includes at least one of the following parameters:

a PLMN identifier list of the at least one second cell;
a cell identifier list of the at least one second cell;
a carrier frequency list of the at least one second cell;
a multicast group identifier list of the at least one second cell; and
a time domain resource used by the at least one second cell to transmit the multicast service data.

A ninth aspect provides user equipment, and the user equipment includes a processor, a memory, and a network interface. The network interface may include a radio frequency receiver and a radio frequency transmitter. The processor is connected to the memory and the network interface. The processor may perform the following operations:

receiving, by using the radio frequency receiver, a resource request message sent by a base station of a first cell; reading first multicast resource information of at least one second cell at a specified location of the at least one second cell based on the resource request message; adding the first multicast resource information to a resource request feedback message; and reporting the resource request feedback message to the base station of the first cell by using the radio frequency transmitter.

In a possible design, the processor may further send capability reporting information to the base station of the first cell by using the radio frequency transmitter, where the capability reporting information is used to indicate that the user equipment has a capability of reading a resource configuration of each second cell.

In a possible design, the resource request feedback message includes at least one of the following parameters:

a PLMN identifier list of the at least one second cell;
a cell identifier list of the at least one second cell;
a carrier frequency list of the at least one second cell;
a multicast group identifier list of the at least one second cell; and
a time domain resource used by the at least one second cell to transmit the multicast service data.

A tenth aspect provides a computer storage medium. The computer storage medium stores a program, and the program is used to perform some or all steps of the first aspect.

An eleventh aspect provides a computer storage medium. The computer storage medium stores a program, and the program is used to perform some or all steps of the second aspect.

A twelfth aspect provides a computer storage medium. The computer storage medium stores a program, and the program is used to perform some or all steps of the third aspect.

BRIEF DESCRIPTION OF DRAWINGS

To describe the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In this part, some basic concepts in each embodiment of the present invention are first described.

The technical solutions in the embodiments of the present invention may be applied to various communications systems, such as a Global System for Mobile Communications (GSM), a Code Division Multiple Access (CDMA) system, a Wideband Code Division Multiple Access (WCDMA) system, and an LTE system. The LTE system is used below as an example.

A multicast service provided in the embodiments of the present invention is a service sent by a cell in a broadcast manner or a multicast manner, and includes a video conference, television broadcasting, a video on demand, an advertisement, online education, an interactive game, an Internet of Vehicles service, and the like. The following embodiments are described in detail by using the Internet of Vehicles service as an example.

Figure 1:
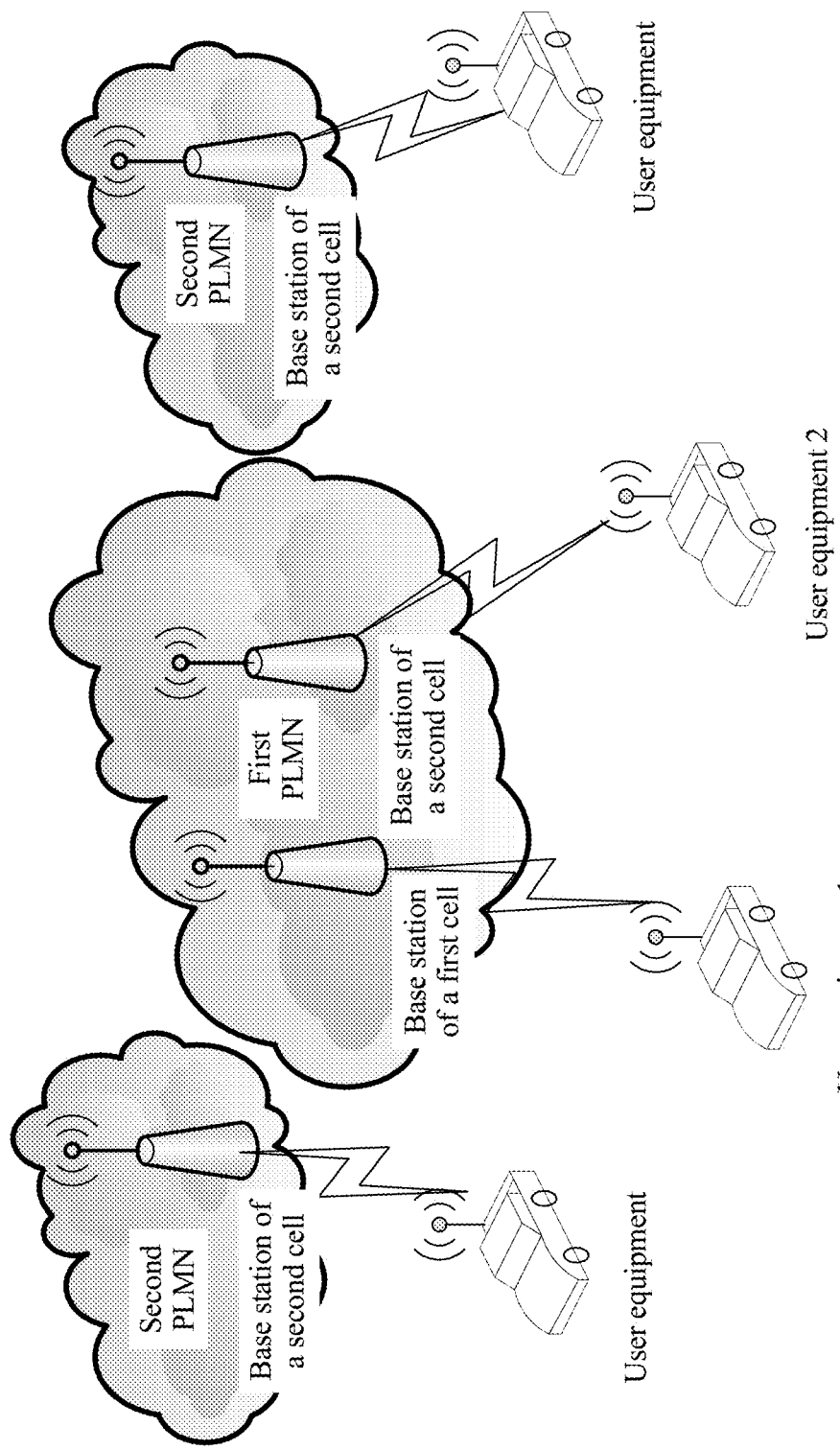
FIG. 1 shows an application scenario of a multicast transmission method.

Referring to FIG. 1, FIG. 1 shows an application scenario of a multicast transmission method.

A base station shown in FIG. 1 includes an evolved NodeB (eNB) in LTE, a base transceiver station (BTS) in GSM or CDMA, a NodeB (NB) in WCDMA, or a network device (such as a base station or a controller) in a future communications system such as 5G.

User equipment shown in FIG. 1 includes a terminal, a mobile station (MS), a mobile terminal (Mobile Terminal), and the like. The user equipment may communicate with one or more core networks by using a radio access network (RAN). For example, the user equipment may be a mobile phone (also referred to as a "cellular" phone) or a computer with a mobile terminal. For example, the user equipment may be a portable, pocket-sized, handheld, computer built-in, or in-vehicle mobile apparatus, which exchanges data with the radio access network.

A first cell is a cell of a PLMN of a first operator. At least one second cell may be a cell of another operator (such as a second operator or a third operator) different from the first operator, or at least one second cell may be another cell of the first operator. An operator is a provider that provides a network service, such as China Unicom, China Mobile, China Telecom, or US Telecom. It should be noted that a base station of the first cell and a base station of the second cell are not a same base station.

In this embodiment of the present invention, the first cell may actively send, in a broadcast manner, obtained multicast resource information of the at least one second cell to the user equipment, thereby reducing configuration overheads. The following provides detailed description by using embodiments shown in FIG. 2 to FIG. 4.

Figure 2:
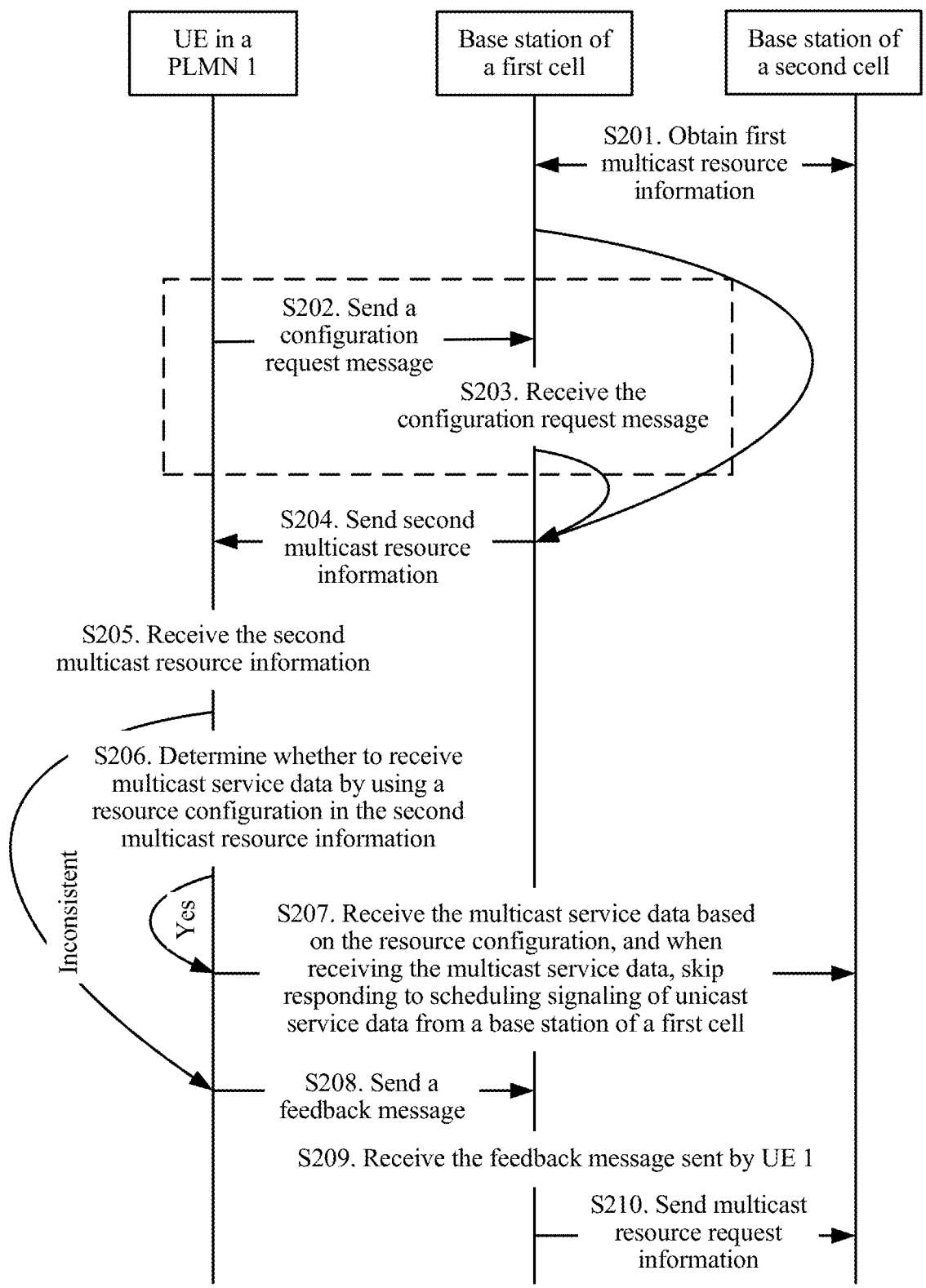
FIG. 2 is a schematic flowchart of a multicast transmission method according to an embodiment of the present invention.

Referring to FIG. 2, FIG. 2 is a schematic flowchart of a multicast transmission method according to an embodiment of the present invention. This embodiment of the present invention is performed in a scenario in which a signaling interaction interface or an operation, administration and maintenance interface is preset between a base station of a first cell and a base station of each of at least one second cell. In this embodiment of the present invention, that the "at least one second cell" is one non-first cell is used as an example. As shown in FIG. 2, the method includes the following steps.

S201. The base station of the first cell obtains first multicast resource information of a second cell by using a preset interface such as the signaling interaction interface or the operation, administration and maintenance interface.

The first multicast resource information includes a resource configuration used by the second cell to transmit multicast service data, for example, a subframe location, a frequency domain location, or a modulation scheme used by the second cell to transmit the multicast service data. Further, the first multicast resource information further includes time domain offset information, and the time domain offset information is used to indicate a time offset between the base station of the first cell and the second cell.

In some possible designs, the time domain offset information is a subframe difference of the first cell relative to the second cell. For example, a subframe "8" in the first cell corresponds to a subframe "15" in the second cell, and the time domain offset information is "−7". For another example, a subframe "15" in the first cell corresponds to a subframe "8" in the second cell, and the time domain offset information is "+7".

In some other possible designs, the time domain offset information is a subframe difference of the second cell relative to the first cell. For example, the subframe "8" in the first cell corresponds to the subframe "15" in the second cell, and the time domain offset information is "+7". For another example, the subframe "15" in the first cell corresponds to the subframe "8" in the second cell, and the time domain offset information is "−7".

It should be noted that the subframe difference may be recorded in various existing recording manners, and the present invention should not be limited to the foregoing manner.

Further, the first multicast resource information further includes service type information of the multicast service data. The service type information is used to indicate a service type of the multicast service data, for example, one of an Internet of Vehicles service, a broadcast program service, and an advertisement service. The service type information may be represented by using a TMGI or a multicast session identifier (such as a session ID in LTE).

It should be noted that if the second cell is at least two non-first cells, the first multicast resource information obtained by the base station of the first cell includes resource configurations used by the at least two non-first cells to transmit multicast service data.

S202. Optionally, user equipment (namely, UE in a PLMN 1 in FIG. 2, UE 1 for short below) in the first cell sends a configuration request message to the base station of the first cell, where the configuration request message is used to request multicast resource information of the second cell. Information carried in the configuration request message may include at least one of a PLMN identifier list, a multicast group identifier list, a carrier frequency list, and a cell identifier list, and the information should be related to a multicast service in which the user equipment is interested.

S203. Optionally, the base station of the first cell receives the configuration request message sent by the UE 1.

S204. The base station of the first cell sends second multicast resource information to served user equipment, where the second multicast resource information is used to indicate a resource configuration used by the second cell to transmit multicast service data. Optionally, the first multicast resource information is associated with the second multicast resource information.

In some possible designs, the base station of the first cell directly uses the obtained first multicast resource information as the second multicast resource information and sends the obtained first multicast resource information to the user equipment.

In some other possible designs, the base station of the first cell processes the obtained first multicast resource information, for example, obtains a time domain location of a resource from the first multicast resource information, and sends the processed first multicast resource information to the user equipment as the second multicast resource information.

The first multicast resource information may be sent to the user equipment served by the base station of the first cell, by using an extended broadcast message in an existing system, for example, a SIB message or an MCCH message in LTE, or may be notified to the user equipment by using a paging message.

Optionally, if the base station of the first cell receives the configuration request message of the UE 1, the base station of the first cell is requested to send a configuration of a multicast resource of interest. Specifically, the configuration request information may include at least one of the following information:

a PLMN identifier list of services of interest;
a cell identifier list of the services of interest;

a carrier frequency list of the services of interest; and a multicast group identifier list of the services of interest.

If the base station of the first cell finds that there is locally no multicast resource information in which the UE 1 is interested, the base station of the first cell obtains the multicast resource information of the second cell by using the signaling interaction interface or the operation, administration and maintenance interface.

S205. The UE 1 receives the second multicast resource information sent by the base station of the first cell.

It should be noted that if the base station of the first cell sends the second multicast resource information to the served user equipment in a broadcast manner, all user equipments served by the base station of the first cell may receive the second multicast resource information. A processing procedure used after each user equipment receives the second multicast resource information is the same. In this embodiment of the present invention, the UE 1 is used as an example for description.

S206. The UE 1 determines, based on service type information in the second multicast resource information, whether to receive the multicast service data by using the resource configuration in the second multicast resource information. If the UE 1 determines, based on the service type information in the second multicast resource information, to receive the multicast service data by using the resource configuration in the second multicast resource information, S207 is performed.

Specifically, the UE 1 determines, based on the service type information, whether a priority of the multicast service data is higher than a priority of unicast service data transmitted by the base station of the first cell to the UE 1.

S207. The UE 1 receives the multicast service data based on the resource configuration, and when receiving the multicast service data, the UE 1 skips responding to scheduling signaling of unicast service data from the base station of the first cell.

S208. The UE 1 sends a feedback message to the base station of the first cell, where the feedback message is sent by the UE 1 when a resource location configured by the base station of the first cell for the second cell is inconsistent with a resource location used by the second cell to transmit the multicast service data.

The feedback information may carry one or more of the following information: 1-bit information indicating resource location inconsistency, a PLMN identifier list of the second cell, a carrier frequency list of the second cell, and a multicast service identifier list of the second cell.

S209. The base station of the first cell receives the feedback message sent by the UE 1.

S210. The base station of the first cell sends multicast resource request information to one or more second cells whose resource locations are inconsistent with resource locations configured by the base station of the first cell, where the multicast resource request information is used to request a resource configuration of the one or more second cells.

It should be noted that FIG. 2 only shows that the multicast resource request information is sent to one second cell.

Further, when the UE 1 is handed over from the base station of the first cell to a base station of the second cell, a handover from the base station of the first cell to the base station of the second cell in FIG. 1 is used as an example. The base station of the second cell receives handover request information sent by the base station of the first cell, and the handover request information carries multicast resource information that is of at least one third cell (the third cell may also be the base station of the first cell) and that is configured by the base station of the first cell for the UE 1, and a time domain offset between a cell before the handover and a cell after the handover. After receiving the handover request information, the base station of the second cell sends configuration signaling to other user equipments (such as UE 2) within a coverage range of the base station of the second cell. The configuration signaling carries the multicast resource information of the at least one third cell, and the time domain offset between the cell before the handover and the cell after the handover has already been considered in the information. The UE 2 receives the multicast service data at the resource location based on the configuration signaling.

In a feasible design, in a process in which the user equipment is handed over to the second cell, the first cell sends first request information (such as the handover request information in an LTE system) to the second cell, where the first request information includes indication information of the user equipment, so that the second cell determines a first bearer of the user equipment, and the first bearer (for example, an E-RAB bearer) supports both a device-to-device direct link and a device-to-base station transmission link. For example, the indication information is used to indicate a first service type that is being transmitted by the user equipment. For example, the service type may be a V2X service, and the indication information may be any information that can be used to indicate a feature of the bearer that can be supported by the user equipment. A technical advantage of the design is that the second cell may identify, in a timely and accurate manner, an attribute of the first bearer of the user equipment based on the indication information, and supports a handover of the first bearer of the user equipment from a radio bearer between base stations to a direct link radio bearer for transmission.

In another possible design, the first request information sent by the base station of the first cell to the second cell carries first configuration information, the first configuration information is used to indicate a transmission manner that is used by the base station of the first cell for a first service, and the transmission manner may be device-to-device direct link transmission and device-to-base station transmission.

A technical advantage of the design is that the second cell may identify, in a timely and accurate manner, the transmission manner of the first service of the base station of the first cell based on the indication information.

In this embodiment shown in FIG. 2, the base station of the first cell obtains the multicast resource information of the second cell by using the signaling interaction interface or the operation, administration and maintenance interface, and actively sends the obtained multicast resource information to the user equipment in the broadcast manner. In this way, the base station of the first cell does not need to configure, in a unicast manner for each user equipment, the resource location for sending/reading the multicast service data of the second cell, thereby reducing signaling overheads.

Figure 3A:
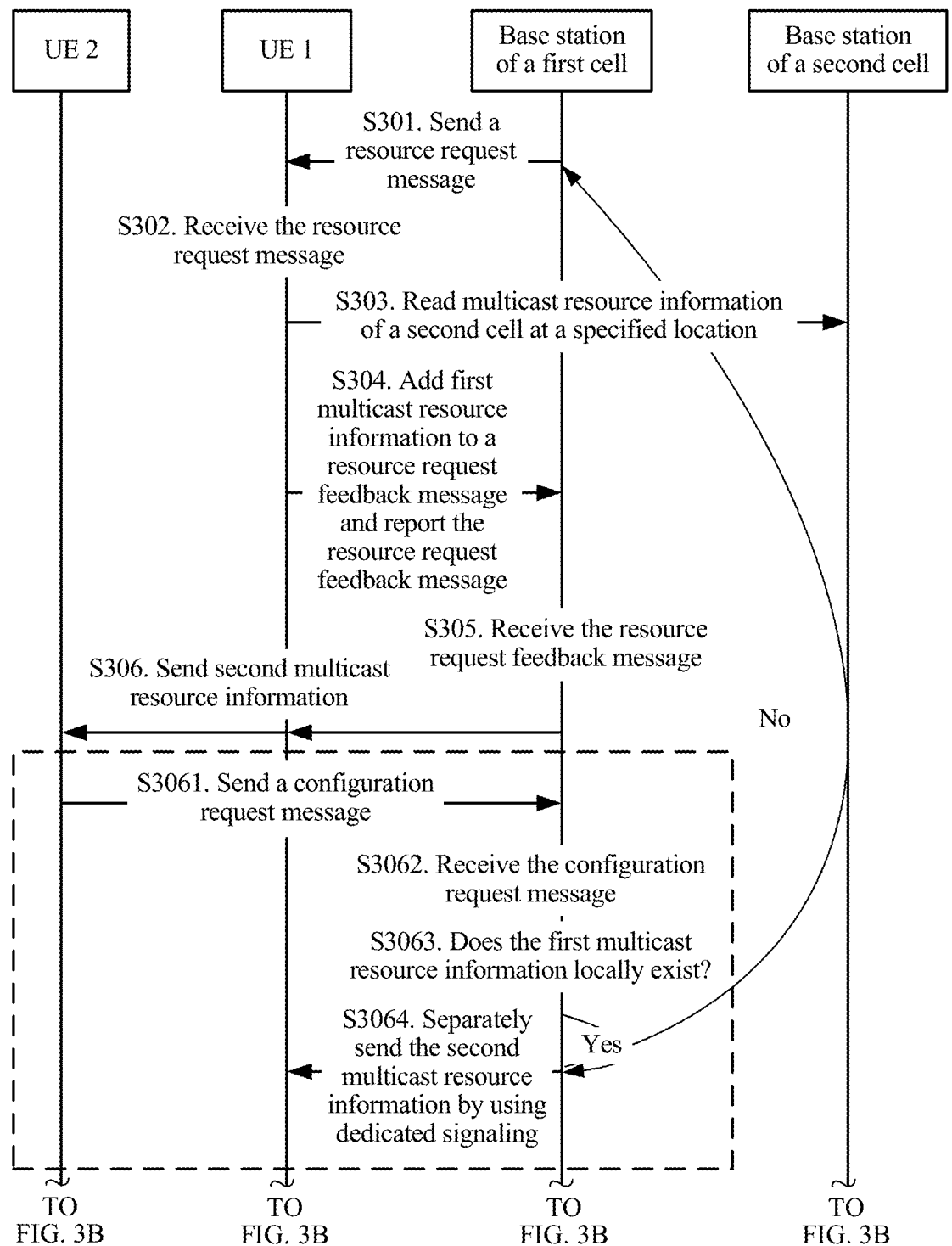
FIG. 3A and FIG. 3B are a schematic flowchart of another multicast transmission method according to an embodiment of the present invention.
Figure 3B:
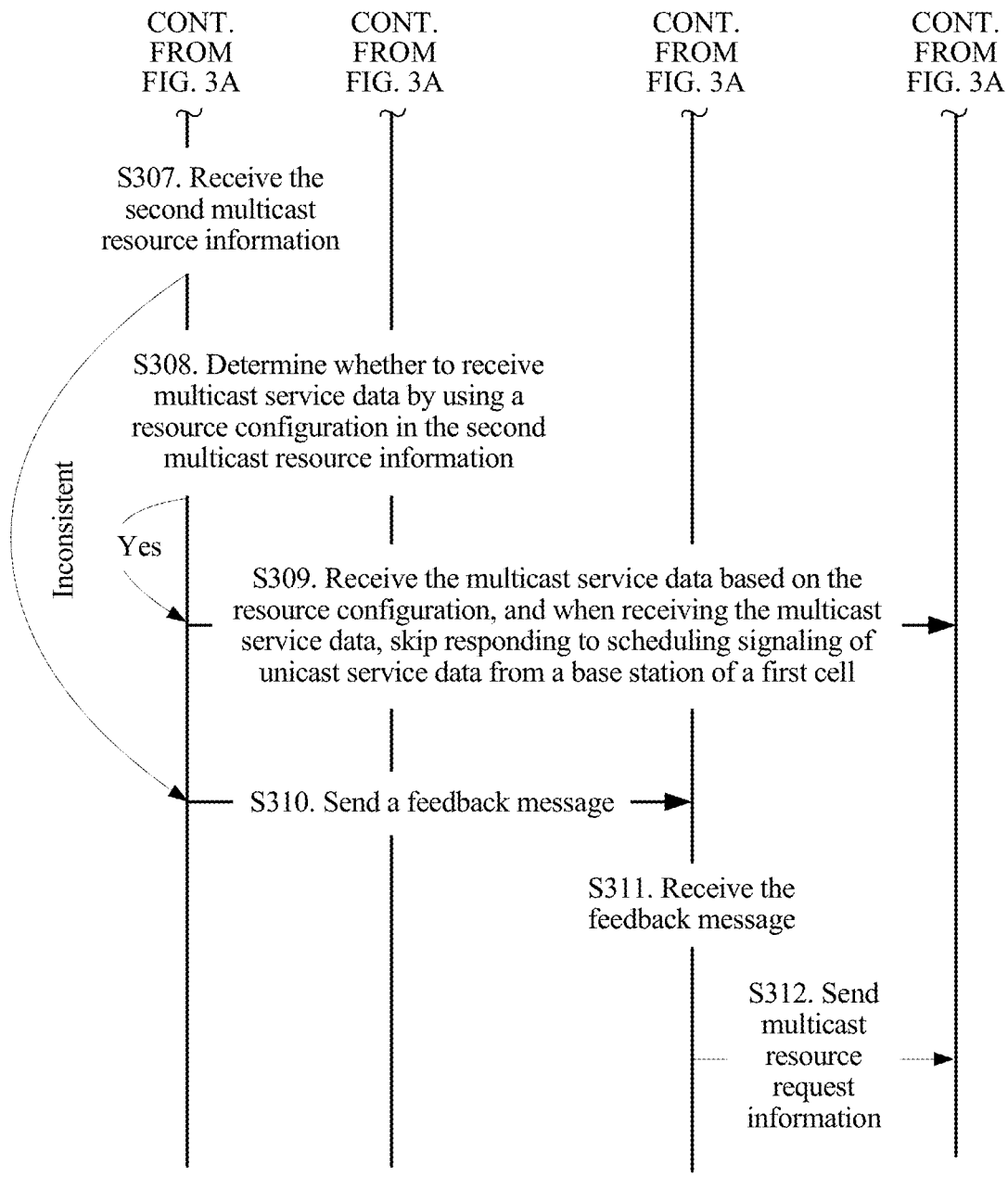

FIG. 3A and FIG. 3B are a schematic flowchart of another multicast transmission method according to an embodiment of the present invention. This embodiment of the present invention is performed in a scenario in which a signaling interaction interface and an operation, administration and maintenance interface are not set between a base station of a first cell and each of at least one second cell. In this embodiment of the present invention, that the "at least one second cell" is one non-first cell is used as an example. As shown in FIG. 3A and FIG. 3B, the method includes the following steps.

S301. The base station of the first cell sends a resource request message to first user equipment ("UE 1" for short below), where the resource request message is used to instruct the UE 1 to read multicast resource information of a second cell and report the multicast resource information to the base station of the first cell.

The UE 1 is user equipment connected to the base station of the first cell, the UE 1 has a capability of reading a resource configuration of a base station of the second cell, and the base station of the first cell has already obtained, in advance, capability reporting information indicating that the UE 1 has the capability.

It should be noted that in user equipments served by the base station of the first cell, at least one user equipment in a connected state has the foregoing capability, and the UE 1 is only one of user equipments having the foregoing capability. Because a processing procedure used after the user equipment receives the resource request message is the same, in this embodiment of the present invention, the UE 1 is used as an example.

S302. The UE 1 receives the resource request message.

S303. The UE 1 reads the multicast resource information of the second cell at a specified location of the second cell based on the resource request message.

If a receiving gap gap is configured for the base station of the first cell, the UE 1 may synchronize with the cell of the second cell at a time domain location of the gap, to obtain the multicast resource information of the second cell.

If no gap is configured for the base station of the first cell, the UE 1 synchronizes with the cell of the second cell during a sleep time of the UE 1, to obtain the multicast resource information of the second cell. Optionally, when UE 1 has a plurality of receive channels, the UE 1 may read the multicast resource information of the second cell by using one idle receive channel.

If the base station of the first cell configures a timer for this operation, after receiving the resource request message, the UE 1 starts the timer based on a configuration of the timer, and feeds back a measurement result within a specified time. If the multicast resource information of the second cell is still not read when the timer expires, measurement failure information is fed back.

S304. The UE1 adds the multicast resource information ("first multicast resource information" for short below) of the second cell to a resource request feedback message, and reports the resource request feedback message to the base station of the first cell.

S305. The base station of the first cell receives the resource request feedback message of the UE 1.

S306. The base station of the first cell sends second multicast resource information to served user equipment, where the second multicast resource information is used to indicate a resource configuration used by the second cell to transmit multicast service data. Optionally, the first multicast resource information is associated with the second multicast resource information.

Further, when the base station of the first cell sends the second multicast resource information in a broadcast manner, all user equipments served by the base station of the first cell may receive the second multicast resource information. Because a processing procedure used after the user equipment receives the second multicast resource information is the same, in this embodiment of the present invention, UE 2 is used as an example.

The UE 2 may actively request, from the base station of the first cell, multicast resource information of interest of the second cell, and specific steps are as follows:

S3061. The UE 2 sends a configuration request message to the base station of the first cell, where the configuration request message is used to request the multicast resource information of the second cell.

The user equipment actively requests the cell to obtain the multicast resource information in which the user equipment is interested, improving signaling resource utilization. It should be noted that in this embodiment shown in FIG. 3A and FIG. 3B, if the UE 2 has a capability of reading the resource configuration of the second cell, the UE 1 and the UE 2 may be same user equipment. If the UE 2 does not have a capability of reading the resource configuration of the second cell, the UE 1 and the UE 2 are different user equipments.

S3062. The base station of the first cell receives the configuration request message sent by the UE 2.

S3063. The base station of the first cell locally obtains the first multicast resource information based on the configuration request message. It may be understood that if the multicast resource information of the second cell does not locally exist, the base station of the first cell may perform S301 to S305 to obtain the multicast resource information of the second cell.

S3064. The base station of the first cell sends the multicast resource information to the UE 2 by using dedicated signaling.

S307. The UE 2 receives the second multicast resource information sent by the base station of the first cell.

S308. The UE 2 determines, based on service type information in the second multicast resource information, whether to receive the multicast service data by using the resource configuration in the second multicast resource information. If the UE 2 determines, based on the service type information in the second multicast resource information, to receive the multicast service data by using the resource configuration in the second multicast resource information, S309 is performed.

S309. The UE 2 receives the multicast service data based on the resource configuration, and when receiving the multicast service data, the UE 2 skips responding to scheduling signaling of unicast service data from the base station of the first cell.

S310. The UE 2 sends a feedback message to the base station of the first cell, where the feedback message is sent by the UE 2 when a resource location configured by the base station of the first cell for the second cell is inconsistent with a resource location used by the second cell to transmit the multicast service data.

S311. The base station of the first cell receives the feedback message sent by the UE 2.

S312. The base station of the first cell sends multicast resource request information to one or more second cells whose resource locations are inconsistent with resource locations configured by the base station of the first cell, where the multicast resource request information is used to request a resource configuration of the one or more second cells.

Further, when the UE 1 is handed over from the base station of the first cell to another cell, a handover from the base station of the first cell to the base station of the second cell in FIG. 1 is used as an example. The base station of the second cell receives handover request information sent by the base station of the first cell, and the handover request information carries multicast resource information that is of at least one third cell (the third cell may also be the base station of the first cell) and that is configured by the base station of the first cell for the UE 1, and a time domain offset between a cell before the handover and a cell after the handover. After receiving the handover request information, the second cell sends configuration signaling to the UE 2 within a coverage range of the cell. The configuration signaling carries the multicast resource information of the at least one third cell, and the time domain offset between the cell before the handover and the cell after the handover has already been considered in the information. The UE 2 calculates, based on the configuration signaling, a time domain location and receives the multicast service data at the time domain location.

In a feasible design, in a process in which the user equipment is handed over to the second cell, the first cell sends first request information (such as the handover request information in an LTE system) to the second cell, where the first request information includes indication information of the user equipment, so that the second cell determines a first bearer of the user equipment, and the first bearer (for example, an E-RAB bearer) supports both a device-to-device direct link and a device-to-base station transmission link. For example, the indication information is used to indicate a first service type that is being transmitted by the user equipment. For example, the service type may be a V2X service, and the indication information may be any information that can be used to indicate a feature of the bearer that can be supported by the user equipment.

In this embodiment shown in FIG. 3A and FIG. 3B, the base station of the first cell obtains the multicast resource information of the at least one second cell by using the user equipment in the connected state, and actively sends the obtained multicast resource information to the user equipment in the broadcast manner. In this way, the base station of the first cell does not need to configure, in a unicast manner for each user equipment, the resource location for sending/reading the multicast service data of the at least one second cell, thereby reducing overheads.

Figure 4:
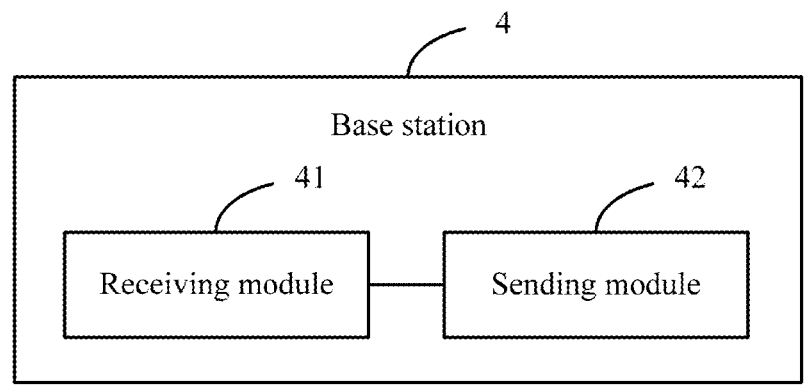
FIG. 4 is a schematic structural diagram of a base station according to an embodiment of the present invention.

Referring to FIG. 4, FIG. 4 is a schematic structural diagram of a base station 4 according to the present invention. As shown in FIG. 4, the cell 4 includes at least a receiving module 41 and a sending module 42. The foregoing modules of the base station perform the following operations.

The receiving module 41 is configured to obtain first multicast resource information of at least one second cell, where the base station of the first cell is different from a base station of each second cell. The sending module 42 is configured to send second multicast resource information to user equipment, where the first multicast resource information is associated with the second multicast resource information, and the second multicast resource information is used to indicate a resource configuration used by each second cell to transmit multicast service data.

In an optional embodiment, the receiving module 41 obtains the first multicast resource information of the at least one second cell by using a signaling interaction interface or an operation, administration and maintenance interface.

In an optional embodiment, the receiving module 41 receives a resource request feedback message sent by the user equipment, where the resource request feedback message carries the first multicast resource information of the at least one second cell.

In an optional embodiment, the sending module 42 sends a resource request message to user equipment in a connected state, where the resource request message is used to instruct the user equipment to read the first multicast resource information of the at least one second cell and report the first multicast resource information of the at least one second cell to the base station of the first cell.

In an optional embodiment, the receiving module 41 receives a configuration request message sent by the user equipment, where the configuration request message is used to request the first multicast resource information of the at least one second cell.

In an optional embodiment, the receiving module 41 receives a feedback message sent by the user equipment, where the feedback message is sent by the user equipment when a configured resource location of at least one cell of the at least one second cell is inconsistent with a resource location used by the cell to transmit the multicast service data. The sending module 42 sends multicast resource request information to one or more second cells whose resource locations are inconsistent with resource locations configured by the base station of the first cell, where the multicast resource request information is used to request a resource configuration of the one or more second cells.

In an optional embodiment, the receiving module 41 receives handover request information sent by the second cell, where the handover request information carries at least one of the following information: multicast resource information that is of at least one third cell and that is configured by the second cell for user equipment to be handed over, and a time domain offset between a cell before the handover and a cell after the handover, where the time domain offset is used to instruct the user equipment to adjust the resource location for receiving the multicast service data to a time domain location of the cell after the handover.

Figure 5:
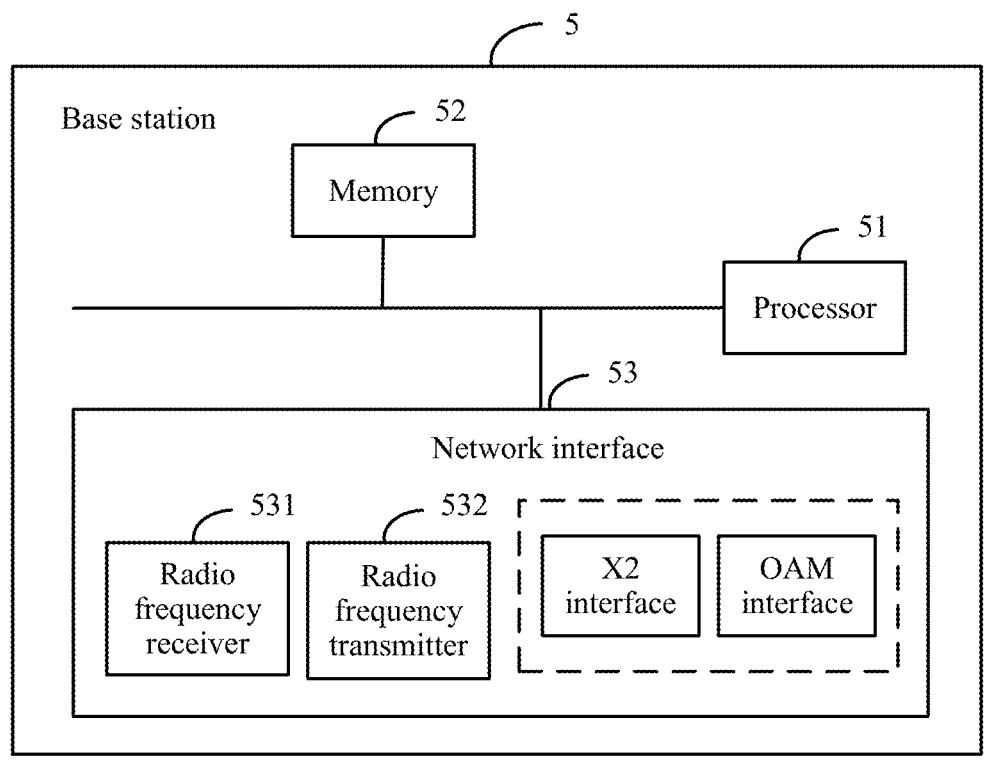
FIG. 5 is a schematic structural diagram of another base station according to an embodiment of the present invention.

Referring to FIG. 5, FIG. 5 is a schematic structural diagram of a base station 5 according to an embodiment of the present invention. As shown in FIG. 5, the base station 5 includes a processor 51, a memory 52, and a network interface 53. The network interface 53 may include a radio frequency receiver 531 and a radio frequency transmitter 532. The processor 51 is connected to the memory 52 and the network interface 53. For example, the processor 51 may be connected to the memory 52 and the network interface 53 by using a bus.

The processor 51 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 52 is configured to store multicast resource information of at least one second cell, and program code for performing the foregoing method. The memory 52 may include a volatile memory, for example, a random access memory (RAM); the memory 52 may include a non-volatile memory, for example, a read-only memory (ROM), a flash memory, a hard disk drive (HDD), or a solid-state drive (SSD); or the memory 52 may include a combination of the foregoing types of memories.

The network interface 53 communicates with user equipment by using the radio frequency receiver 531 and the radio frequency transmitter 532. In some possible designs, the network interface 53 may further include a signaling interaction interface (namely, an X2 interface in FIG. 5) or an operation, administration and maintenance interface (namely, an OAM interface in FIG. 5).

The processor 51 performs a corresponding function of the base station of the first cell in the foregoing method by invoking the code stored in the memory 52. For details, refer to the embodiment shown in FIG. 2 or FIG. 3A and FIG. 3B. Details are not described herein again.

Figure 6:
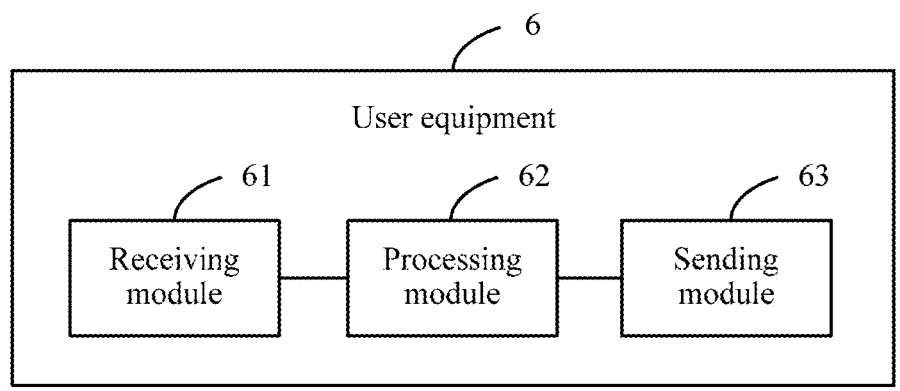
FIG. 6 is a schematic structural diagram of user equipment according to an embodiment of the present invention.

Referring to FIG. 6, FIG. 6 is a schematic structural diagram of user equipment 6 according to an embodiment of the present invention. As shown in FIG. 6, the user equipment 6 includes at least a receiving module 61, a sending module 62, and a processing module 63.

In an optional embodiment, the foregoing modules of the user equipment 6 perform the following operations.

The receiving module 61 is configured to receive multicast resource information sent by a base station of a first cell, where the multicast resource information is used to indicate a resource configuration used by at least one second cell to transmit multicast service data.

In an optional embodiment, the multicast resource information further includes service type information of the multicast service data. The processing module 62 determines, based on the service type information, whether to receive the multicast service data by using the resource configuration in the multicast resource information.

In an optional embodiment, the processing module 62 determines, based on the service type information, whether a priority of the multicast service data is higher than a priority of unicast service data transmitted by the base station of the first cell to the user equipment. If the priority of the multicast service data is higher than the priority of the unicast service data transmitted by the base station of the first cell to the user equipment, the processing module 62 receives the multicast service data based on the resource configuration, and when receiving the multicast service data, the processing module 62 skips responding to scheduling signaling of the unicast service data from the base station of the first cell.

In an optional embodiment, after the user equipment is handed over to the second cell, the receiving module 61 receives configuration signaling sent from a base station of the second cell, where the configuration signaling carries at least one of the following information configured by the second cell for the user equipment: multicast resource information of at least one third cell, and a time domain offset between a cell before the handover and a cell after the handover. The processing module 62 calculates, based on the configuration signaling, a time domain location used by the at least one third cell to transmit multicast service data, and receives the multicast service data at the time domain location.

In an optional embodiment, the sending module 63 sends a configuration request message to the base station of the first cell, where the configuration request message is used to request the resource configuration used to receive the multicast service data.

In an optional embodiment, when a resource location that is of at least one cell of the at least one second cell and that is configured by the base station of the first cell is inconsistent with a resource location used by the cell to transmit the multicast service data, the sending module 63 sends a feedback message to the base station of the first cell.

In an optional embodiment, the foregoing modules of the user equipment 6 perform the following operations.

The receiving module 61 receives a resource request message sent by a base station of a first cell. The processing module 62 reads first multicast resource information of at least one second cell at a specified location of the at least one second cell based on the resource request message. The processing module 62 adds the first multicast resource information to a resource request feedback message. The sending module 63 reports the resource request feedback message to the base station of the first cell.

In an optional embodiment, the sending module 63 sends capability reporting information to the base station of the first cell, where the capability reporting information is used to indicate that the user equipment has a capability of reading a resource configuration of each second cell.

Figure 7:
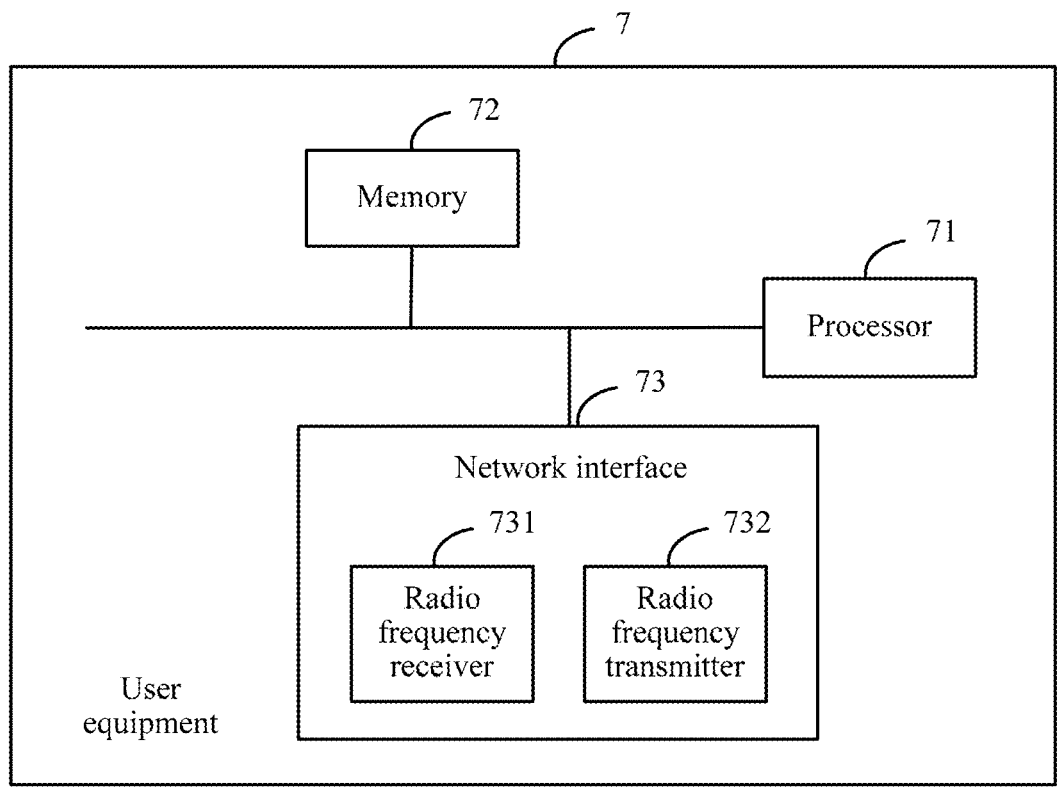
FIG. 7 is a schematic structural diagram of another user equipment according to an embodiment of the present invention.

Referring to FIG. 7, FIG. 7 is a schematic structural diagram of user equipment 7 according to an embodiment of the present invention. As shown in FIG. 7, the user equipment 7 includes a processor 71, a memory 72, and a network interface 73. The network interface 73 may include a radio frequency receiver 731 and a radio frequency transmitter 732. The processor 71 is connected to the memory 72 and the network interface 73. For example, the processor 71 may be connected to the memory 72 and the network interface 73 by using a bus.

The processor 71 may be a central processing unit CPU, a hardware chip, or any combination thereof. The hardware chip may be an ASIC, a PLD, or a combination thereof. The PLD may be a CPLD, an FPGA, a GAL, or any combination thereof.

The memory 72 is configured to store program code for performing the foregoing method. The memory 72 may include a volatile memory, for example, a random access memory; the memory 72 may include a non-volatile memory, for example, a ROM, a flash memory, an HDD, or an SSD; or the memory 72 may include a combination of the foregoing types of memories.

The network interface 73 communicates with a cell by using the radio frequency receiver 731 and the radio frequency transmitter 732.

The processor 71 performs a corresponding function of the user equipment in the foregoing method by invoking the code stored in the memory 72. For details, refer to the embodiment shown in FIG. 2 or FIG. 3A and FIG. 3B. Details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What are disclosed above are merely examples of embodiments of the present invention, and certainly are not intended to limit the scope of the claims of the present invention. Therefore, equivalent variations made in accordance with the claims of the present invention shall fall within the scope of the present invention.

What is claimed is:

1. A multicast transmission method, comprising:
    determining, by a base station of a first cell, whether a signaling interaction interface or an operation, administration, and maintenance interface exists between the base station of the first cell and a base station of at least one second cell;
    in response to determining that a signaling interaction interface or an operation, administration, and maintenance interface exists between the base station of the first cell and the base station of the at least one second cell, obtaining, by the base station of the first cell, first multicast resource information of the at least one second cell from the base station of the at least one second cell using the signaling interaction interface or the operation, administration, and maintenance interface, wherein the base station of the first cell is different from a base station of each second cell; and sending, by the base station of the first cell, second multicast resource information to user equipment, wherein the second multicast resource information is used to indicate a resource configuration used by each second cell to transmit multicast service data.

2. The method according to claim 1, wherein the first multicast resource information comprises time domain offset information, and wherein the time domain offset information is used to indicate a time offset between the first cell and each second cell.

3. The method according to claim 1, wherein the first multicast resource information further comprises service type information of the multicast service data.

4. The method according to claim 1, wherein the obtaining, by a base station of a first cell, first multicast resource information of at least one second cell comprises:

receiving, by the base station of the first cell, a resource request feedback message sent by the user equipment, wherein the resource request feedback message carries the first multicast resource information of the at least one second cell.

5. The method according to claim 4, further comprising:

sending, by the base station of the first cell, a resource request message to the user equipment in a connected state, wherein the resource request message is used to instruct the user equipment to read the first multicast resource information of the at least one second cell and report the first multicast resource information of the at least one second cell to the base station of the first cell.

6. The method according to claim 5, wherein the user equipment in the connected state has a capability of reading the resource configuration of the at least one second cell, and wherein the first cell has already obtained, in advance, capability reporting information indicating that the user equipment has the capability.

7. The method according to claim 1, further comprising:

receiving, by the base station of the first cell, handover request information sent by the second cell, wherein the handover request information carries at least one of the following information:

multicast resource information that is of at least one third cell and that is configured by the second cell for the user equipment to be handed over; and a time domain offset between a cell before the handover and a cell after the handover, wherein the time domain offset is used to instruct the user equipment to adjust a resource location for receiving the multicast service data to a time domain location of the cell after the handover.

8. A multicast transmission method, comprising:

receiving, by user equipment, multicast resource information sent by a base station of a first cell, wherein the multicast resource information is used to indicate a resource configuration used by at least one second cell to transmit multicast service data, wherein the multicast resource information further comprises service type information of the multicast service data;

determining, by the user equipment and based on the service type information, whether a priority of the multicast service data is relatively higher than a priority of unicast service data transmitted by the base station of the first cell to the user equipment; and if the priority of the multicast service data is higher than the priority of the unicast service data transmitted by the base station of the first cell to the user equipment:

receiving, by the user equipment, the multicast service data based on the resource configuration; and skipping responding to scheduling signaling of the unicast service data from the base station of the first cell when receiving the multicast service data.

9. The method according to claim 8, wherein the multicast resource information further comprises time domain offset information, and wherein the time domain offset information is used to indicate a time offset between the first cell and each second cell.

10. The method according to claim 8, further comprising, after being handed over to the second cell:

receiving, by the user equipment, configuration signaling sent from a base station of the second cell, wherein the configuration signaling carries at least one of the following information configured by the second cell for the user equipment: multicast resource information of at least one third cell, and a time domain offset between a cell before a handover and a cell after the handover;

calculating, by the user equipment based on the configuration signaling, a time domain location used by the at least one third cell to transmit multicast service data; and receiving the multicast service data at the time domain location.

11. The method according to claim 8, wherein before the receiving, by user equipment, multicast resource information sent by a base station of a first cell, the method further comprises:

sending, by the user equipment, a configuration request message to the base station of the first cell, wherein the configuration request message is used to request the resource configuration used to receive the multicast service data.

12. A multicast transmission method, comprising:

receiving, by user equipment, a resource request message sent by a base station of a first cell;

reading, by the user equipment, first multicast resource information of at least one second cell at a specified location of the at least one second cell based on the resource request message; and adding, by the user equipment, the first multicast resource information to a resource request feedback message;

reporting, by the user equipment, the resource request feedback message to the base station of the first cell;

receiving, by the user equipment, second multicast resource information from the base station of the first cell, wherein the second multicast resource information is used to indicate a resource configuration used by the at least one second cell to transmit multicast service data, wherein the second multicast resource information comprises service type information of the multicast service data;

determining, by the user equipment and based on the service type information, whether a priority of the multicast service data is relatively higher than a priority of unicast service data transmitted by the base station of the first cell to the user equipment; and if the priority of the multicast service data is higher than the priority of the unicast service data transmitted by the base station of the first cell to the user equipment:

receiving, by the user equipment, the multicast service data based on the resource configuration; and skipping responding to scheduling signaling of the unicast service data from the base station of the first cell when receiving the multicast service data.

13. The method according to claim 12, wherein before the receiving, by user equipment, a resource request message sent by a base station of a first cell, the method further comprises:

sending, by the user equipment, capability reporting information to the base station of the first cell, wherein the capability reporting information is used to indicate that the user equipment has a capability of reading a resource configuration of each second cell.

14. The method according to claim 12, wherein the resource request feedback message comprises at least one of the following parameters:

a public land mobile network (PLMN) identifier list of the at least one second cell;
a cell identifier list of the at least one second cell;
a carrier frequency list of the at least one second cell;
a multicast group identifier list of the at least one second cell; and
a time domain resource used by the at least one second cell to transmit the multicast service data.

* * * * *